United States Patent
Booth

[11] Patent Number: 6,007,718
[45] Date of Patent: Dec. 28, 1999

[54] FILTER CARTRIDGE HOLDER AND FILTER ASSEMBLY EQUIPPED WITH SAME

[75] Inventor: Walter Booth, East Hanover, N.J.

[73] Assignee: H-Tech, Wilmington, Del.

[21] Appl. No.: 08/926,605

[22] Filed: Sep. 10, 1997

[51] Int. Cl.[6] ................................................. B01D 29/52
[52] U.S. Cl. ...................... 210/232; 210/323.2; 210/453; 210/455; 210/450; 403/13; 403/37; 403/291; 403/326; 403/381
[58] Field of Search ............................... 210/322, 323.1, 210/323.2, 453, 455, 232, 450; 55/510; 403/220, 229, 381, 13, 37, 291, 326

[56] References Cited

U.S. PATENT DOCUMENTS

| | | |
|---|---|---|
| Re. 31,966 | 8/1985 | Sillers, Jr. . |
| 2,904,184 | 9/1959 | Daley et al. . |
| 3,319,793 | 5/1967 | Miller, Jr. et al. . |
| 4,052,317 | 10/1977 | Palnik . |
| 4,062,781 | 12/1977 | Strauss et al. ........................... 210/450 |
| 4,248,714 | 2/1981 | Acosta . |
| 4,428,838 | 1/1984 | Creps et al. . |
| 4,442,004 | 4/1984 | Smith et al. . |
| 4,728,421 | 3/1988 | Moddenmeyer .......................... 210/443 |
| 4,731,184 | 3/1988 | Ostreicher et al. . |
| 4,946,588 | 8/1990 | Wise . |
| 5,399,264 | 3/1995 | Pulek et al. . |
| 5,770,066 | 6/1998 | Coates ................................... 210/323.2 |

Primary Examiner—Matthew O. Savage
Attorney, Agent, or Firm—Selitto & Associates, P.C.

[57] ABSTRACT

A holding device for a filter element is disclosed. More particularly, the holding device includes a body having upper and lower surfaces. The lower surface is sized and shaped so as to engage an end of an associated filter element. The holding device also includes a compressible member, which is positioned on the upper surface of the body, and a connecting mechanism for directly and movably connecting the body to a body of at least one other identical holding device.

57 Claims, 5 Drawing Sheets

FILTER CARTRIDGE HOLDER AND FILTER ASSEMBLY EQUIPPED WITH SAME

FIELD OF THE INVENTION

The present invention relates to filter cartridge holders and filter assemblies equipped with same and, more particularly, to filter cartridge holders adapted to hold, seal, align and interconnect an array of filter cartridges mounted in an associated filter housing.

BACKGROUND OF THE INVENTION

Various filter units have been developed in the past for filtering fluid passing therethrough. One such type of filter unit includes cylindrical filter cartridges which are mounted longitudinally within a filter unit's housing, for instance, in a circular array. Because the filter cartridges are typically open-ended, it is necessary to seal the open ends of each filter cartridge such that fluid flows through an associated filter medium positioned intermediate the ends of the filter cartridge, thereby achieving proper filtering operation. For proper sealing of the filter cartridges, it is desirable to orient them in proper alignment relative to each other and relative to the housing of the filter unit. For various reasons (e.g., manufacturing imprecision), the filter cartridges have slightly different lengths, and, as a result, it has been difficult to properly and positively align and thereby seal the filter cartridges in a quick and efficient manner.

A number of devices have been proposed for aligning and/or sealing filter cartridges mounted within a housing of a filter unit (see, for instance, U.S. Pat. Nos. 2,904,184, 3,319,793, 4,052,317, 4,248,714, 4,428,838, 4,442,004, Re. 31,966, 4,731,184, 4,946,588 and 5,399,264). It is, however, believed that none of the devices disclosed in the foregoing patents is adapted to properly and positively hold, seal and/or align associated filter cartridges in a quick and efficient manner. As a result, there is a need for a filter cartridge holding device adapted for performing these functions in a quick and efficient manner.

SUMMARY OF THE INVENTION

The present invention overcomes the disadvantages and shortcomings of the prior art discussed above by providing a new and improved holding device for a filter element. Briefly, the holding device includes a body having upper and lower surfaces. The lower surface is sized and shaped so as to engage an end of an associated filter element. The holding device also includes a compressible member, which is positioned on the upper surface of the body, and a connecting mechanism for directly and movably connecting the body to a body of at least one other identical holding device. More particularly, the connecting mechanism connects the bodies in such a manner that they are movable in an axial direction relative to each other. To achieve this function, the connecting mechanism includes a laterally extending tongue, which is sized and shaped so as to be slidably received in a groove formed in a body of an identical holding device, and a groove formed in the body and sized and shaped so as to slidably receive a tongue extending laterally from a body of another identical holding device.

In accordance with one feature of the present invention, the compressible member includes a resilient ball positioned on the upper surface of the body. A retaining mechanism retains the ball in a predetermined position.

Yet another feature of the present invention involves a positioning mechanism for positioning an associated filter element in proper alignment relative to the body. The positioning mechanism includes a plurality of positioning ribs depending from the lower surface of the body. The positioning ribs are sized, shaped and oriented so as to be insertable into an opening formed in an end of the associated filter element.

In accordance with yet another feature of the present invention, the holding device is provided with an aligning mechanism for aligning the body in proper position relative to a housing of an associated filter assembly. The aligning mechanism includes an aligning rib which extends laterally from the body and which is sized and shaped so as to engage the housing of the associated filter assembly.

BRIEF DESCRIPTION OF THE DRAWINGS

For a more complete understanding of the present invention, reference is made to the following detailed description of two exemplary embodiments considered in conjunction with the accompanying drawings, in which.

DETAILED DESCRIPTION OF THE EXEMPLARY EMBODIMENTS

The present invention can be used in connection with numerous types of filter cartridges and/or filter units. Accordingly, while the present invention will be described hereinafter in connection with a particular type of filter cartridge/filter unit, it should be understood that the following description of the present invention is only meant to be illustrative of the present invention and is not meant to limit the scope of the present invention, which has applicability to other types of filter cartridges and/or filter units.

Figure 1:
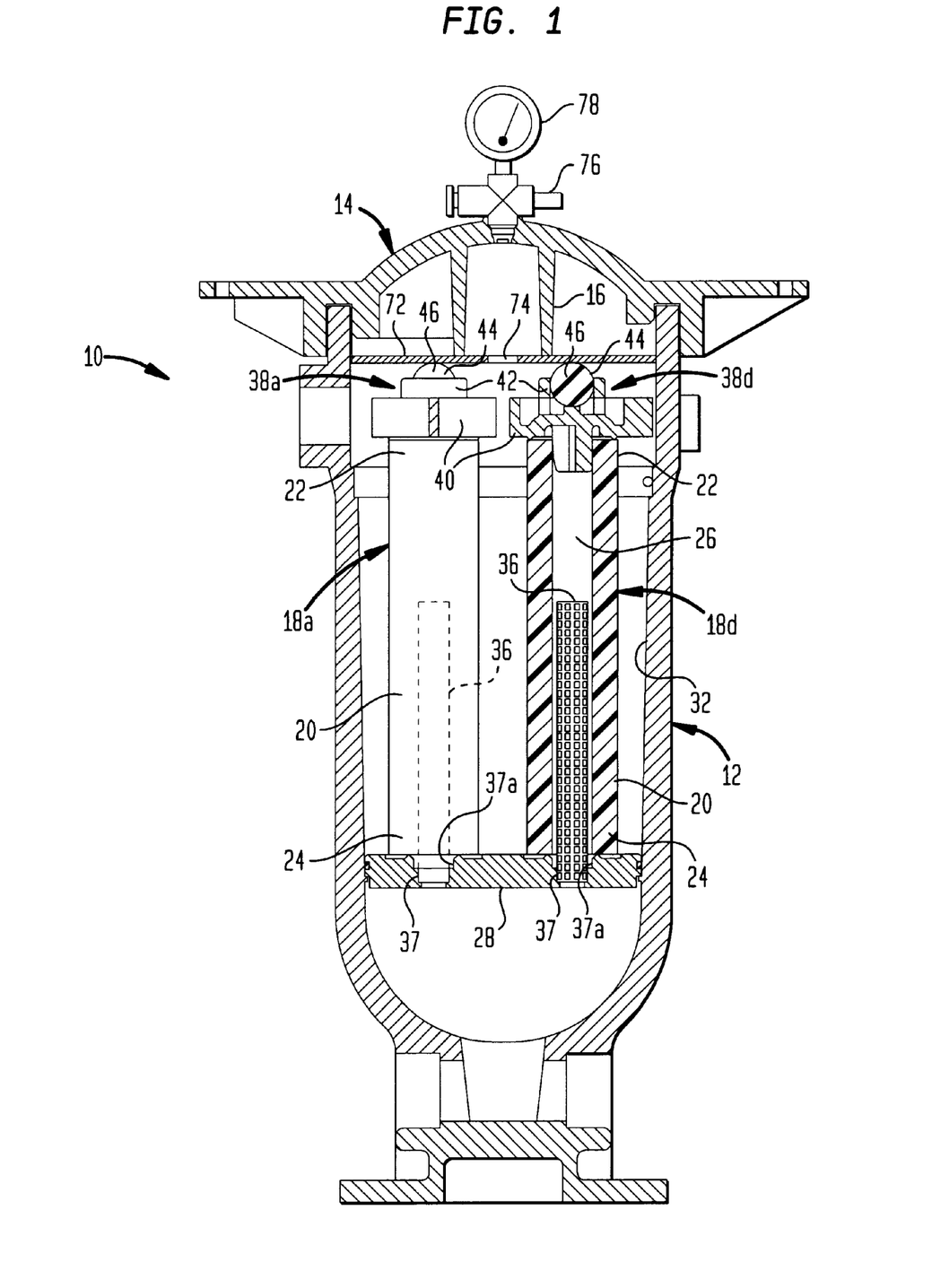
FIG. 1 is a cross-sectional view of a filter assembly which is equipped with filter cartridge sealing holders constructed in accordance with a first embodiment of the present invention.

FIG. 1 shows a filter assembly 10. While the construction of the filter assembly 10 is similar to that of a conventional filter assembly, to facilitate consideration and discussion, it will be described hereinafter.

The filter assembly 10 includes a housing 12 and a cover 14 threadedly secured to the housing 12 for sealing an open end of the housing 12. The cover 14 has a cylindrical extension 16 depending therefrom for purposes to be discussed hereinafter, while the housing 12 has a plurality of conventional filter cartridges 18a–18e mounted therewithin in a circular fashion (see FIG. 2). Each of the cartridges 18a–18e is provided with a filtering medium 20, an open top end 22, an open bottom end 24, and an opening 26 extending between the top and bottom ends 22, 24 through the filtering medium 20.

The filter cartridges 18a–18e are supported in the housing 12 in a conventional manner. For instance, as shown in FIGS. 1, 2, 4A and 4B, the bottom ends 24 of the filter cartridges 18a–18e are mounted on a bottom plate 28, which rests on a plurality of mounting ribs 30 formed on an inner wall 32 of the housing 12. Alternatively, the bottom plate 28 can be integrally formed with the housing 12. In addition, sealing projections 34 (see FIGS. 4A and 4B) are formed on the bottom plate 28 for the purpose of providing fluid-tight connection between the bottom plate 28 and the bottom ends 24 of the filter cartridges 18a–18e. To facilitate the mounting of the filter cartridges 18a–18e on the bottom plate 28, perforated tubes 36 are preferably supported from holes 37 formed in the bottom plate 28 and are received in the openings 26 of the filter cartridges 18a–18e. Alternatively, the filter cartridges 18a–18e can be provided with nipples located at the bottom ends 24 and adapted to be inserted into large portions 37a of the holes 37 for supporting the filter cartridges 18a–18e from the bottom plate 28, thereby eliminating the need to provide the perforated tubes 36. In such circumstances, the nipples can be provided with one or more sealing members, such as O-rings, so that when the nipples are inserted into the large portions 37a of the holes 37, the sealing members engage the surfaces defining the large portions 37a in a fluid-tight manner, thereby providing a seal between the bottom ends 24 of the filter cartridges 18a–18e and the bottom plate 28. In this manner, the sealing members would supplement or replace the seal provided by the sealing projections 34.

Figure 2:
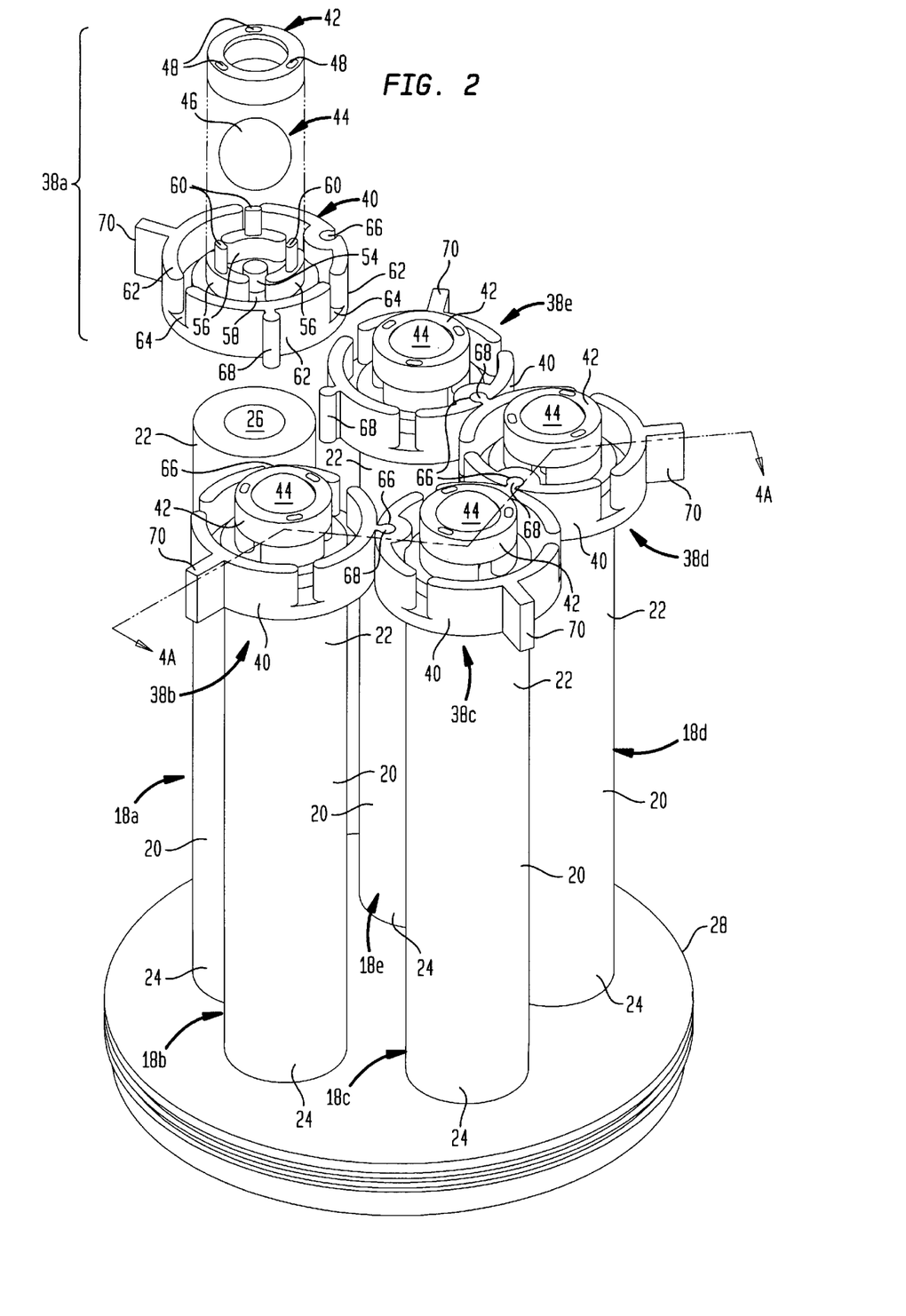
FIG. 2 is a partially exploded perspective view of the filter assembly shown in FIG. 1.

With reference to FIGS. 1 and 2, the filter assembly 10 also includes sealing holders 38a–38e which cooperate with the bottom plate 28 to hold the filter cartridges 18a–18e, respectively, within the housing 12. More particularly, the sealing holders 38a–38e are sized and shaped to engage the open top ends 22 of the filter cartridges 18a–18e, respectively, in a fluid-tight manner for sealing same and for properly positioning the filter cartridges 18a–18e within the housing 12. The sealing holders 38a–38e are preferably identical to each other in size, shape and construction. In such circumstances, the construction of only one of the sealing holders 38a–38e (i.e., the sealing holder 38a) will be described hereinafter with the understanding that the construction of the remaining sealing holders 38b–38e is identical to that of the sealing holder 38a. It should, however, be noted that depending upon the application requirements of the sealing holders 38a–38e, one or more of them can have a different shape, size and/or construction.

With reference to FIG. 2, the sealing holder 38a is provided with a sealing cap 40, a retaining ring 42, and a resilient ball 44. The resilient ball 44 is made from any suitable material, such as ethylene propylene and fluoroelastromer, and is adapted to be captured between the ring 42 and an upper surface of the sealing cap 40 such that the ball 44 has an exposed portion 46 extending above the ring 42 through an aperture formed in same (see FIG. 1). In this manner, the ring 42 retains the ball 44 on the upper surface of the sealing cap 40. The ring 42 has a plurality of holes 48 formed therein for purposes to be discussed hereinafter.

Figure 3:
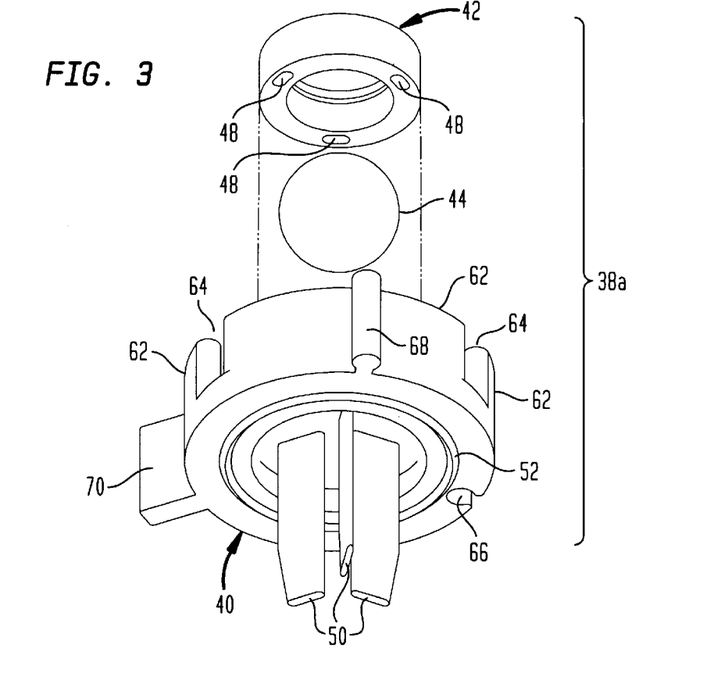
FIG. 3 is an exploded perspective view, looking from below, of one of the sealing holders shown in FIGS. 1 and 2.

Referring to FIGS. 2 and 3, the sealing cap 40 of the sealing holder 38a is preferably made from a thermoplastic material, such as polypropylene, and is provided with a plurality of positioning ribs 50 depending therefrom. The positioning ribs 50 are sized, shaped and arranged so as to be inserted into the opening 26 of the filter cartridge 18a through the top end 22 for easily and properly aligning (i.e., positioning) the filter cartridge 18a relative to the sealing cap 40 and therefore the sealing holder 38a (see the sealing holders 38b–38d shown in FIG. 4A). In addition, each of the positioning ribs 50 is adapted to be broken off from the sealing cap 40 for purposes to be discussed hereinafter. An annular sealing ridge 52 (see FIG. 3) also depends from the sealing cap 40 so as to engage the open top end 22 of the filter cartridge 18a for sealing same as will be discussed in greater detail below.

A post 54 (see FIG. 2) projects from the upper surface of the sealing cap 40 for supporting the ball 44 thereon, while supporting ribs 56 are arranged around the post 54 in a circular fashion for supporting the ring 42 thereon. The supporting ribs 56 are spaced apart from each other to form channels 58 therebetween (see FIG. 2 and 5). Each of the supporting ribs 56 is provided with a pin 60 projecting therefrom and sized and shaped so as to be removably received in one of the holes 48 of the retaining ring 42 for positively positioning the ring 42 on the sealing cap 40. Because the ring 42 is supported on the supporting ribs 56, the ring 42 does not obstruct the channels 58 for a purpose to be discussed hereinafter. The sealing cap 40 also includes walls 62 projecting upwardly from the periphery of the sealing cap 40 and spaced apart from each other to form a channel 64 between each adjacent pair of the walls 62 for a purpose to be discussed hereinafter.

A groove 66 is formed in one of the walls 62 along the entire vertical length thereof, while a tongue 68 is formed on another one of the walls 62 along the entire vertical length thereof. The groove 66 is sized and shaped so as to slidingly receive a tongue 68 of a sealing cap 40 of one of the adjacent pair of the sealing holders (i.e., the sealing holder 38e), while the tongue 68 is sized and shaped so as to be slidingly received in a groove 66 of a sealing cap 40 of the other one of the adjacent pair of the sealing holders (i.e., sealing holder 38b), whereby the sealing holder 38a is movable relative to its adjacent sealing holders 38b, 38e in a vertical direction (i.e., in a direction parallel to the longitudinal axis of the filter cartridge 18a or the longitudinal axis of the housing 12). In this manner, each of the sealing holders 38a–38e is adapted to be directly connected to its adjacent pair of the sealing holders 38a–38e to form a circular array and to thereby interconnect the filter cartridges 18a–18e to one another in a similar interconnected array (see FIGS. 2 and 5). An aligning rib 70 also projects laterally from the remaining one of the walls 62 for purposes to be discussed hereinafter.

Figure 4A:
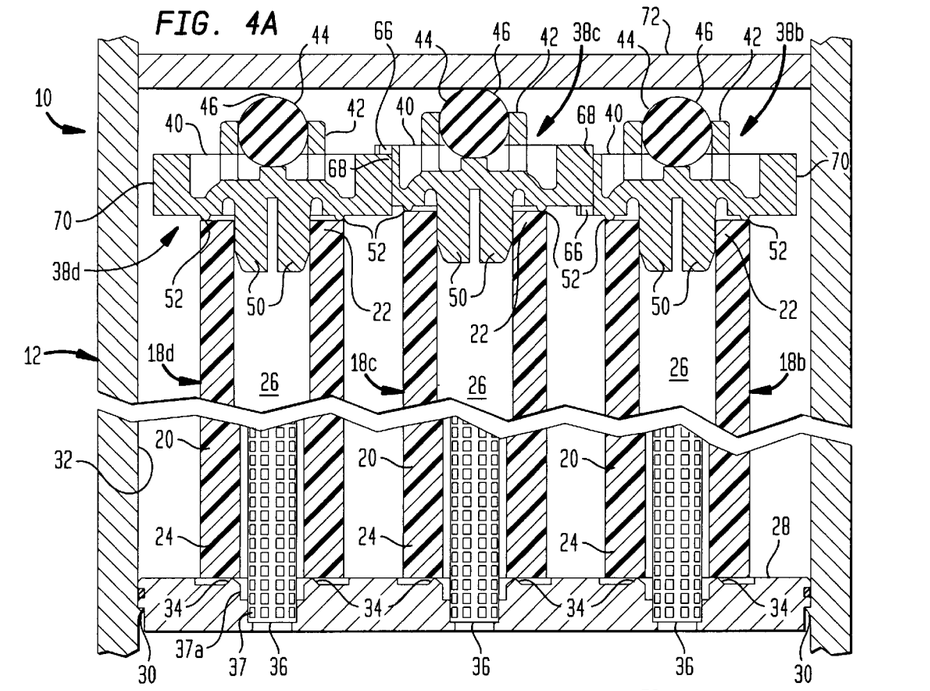
FIG. 4A is a cross-sectional view, taken along section line 4A—4A and looking in the direction of the arrows, of the filter assembly shown in FIG. 2 prior to the application of an associated cover to the filter assembly.
Figure 4B:
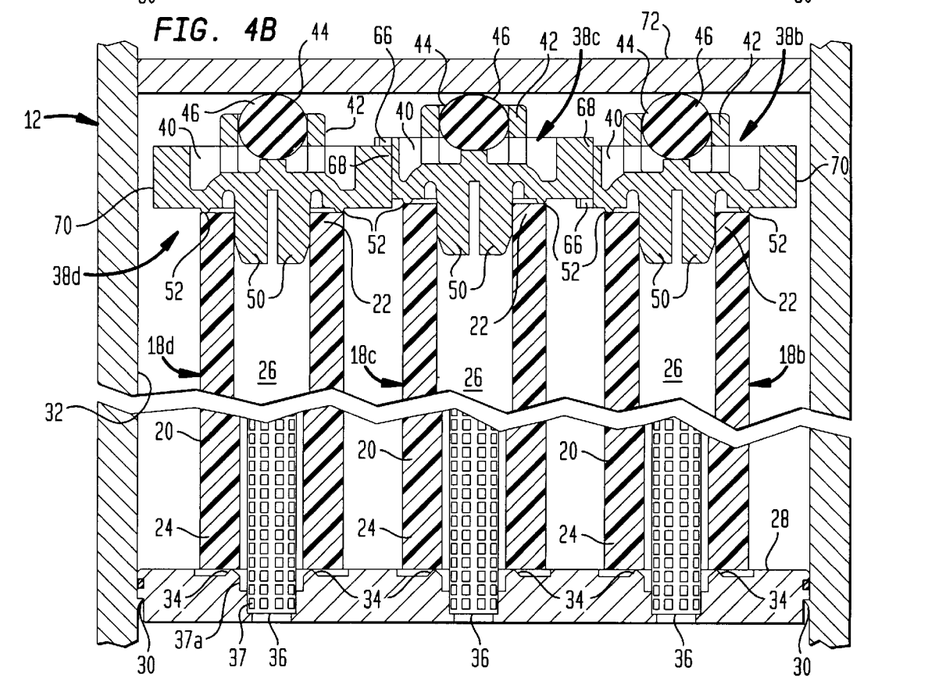
FIG. 4B is a view similar to FIG. 4A, except that the cover is applied to the filter assembly.

Referring to FIGS. 1, 4A and 4B, the filter assembly 10 is also provided with a thrust plate 72 having a keyway (not shown) in a cylindrical wall thereof for receiving a key (not shown) formed on the inner wall 32 of the housing 12 so as to cooperate with same in preventing the thrust plate 72 from rotating during the application of the cover 14 to the housing 12. In this manner, when the thrust plate 72 is urged into contact with the filter holders 38a–38e during the application of the cover 14 to the housing 12, the thrust plate 72 is prevented from exerting a rotational force on the filter holders 38a–38e. As a result, the thrust plate 72 inhibits lateral movement (i.e., movement in a direction transverse to the longitudinal axis of the housing 12) of the filter holders 38a–38e during its application to same and thereby facilitates in aligning the filter cartridges 18a–18e relative to the housing 12. The thrust plate 72 also includes an aperture 74 so as to provide fluid communication between the housing 12 and a valve 76 and a gauge 78 mounted on the cover 14 (see FIG. 1).

With reference to FIGS. 1 and 2, in order to assemble the filter assembly 10, the filter cartridges 18a–18e are supported in the housing 12 in a conventional manner. For instance, with the bottom plate 28 supported on the mounting ribs 30 of the housing 12, the tubes 36 are mounted on the bottom plate 28. Then, the filter cartridges 18a–18e are mounted on the bottom plate 28 by inserting the tubes 36 into the openings 26 of the filter cartridges 18a–18e.

After all of the sealing holders 38a–38e are assembled in the manner described above, they are then mounted on the filter cartridges 18a–18e, respectively. More particularly, the positioning ribs 50 of the sealing holders 38a–38e are inserted into the openings 26 of the filter cartridges 18a–18e, respectively, through the open top ends 22. Each of the sealing holders 38a–38e is then connected with an adjacent pair of the sealing holders 38a–38e via its mating tongue 68 and groove 66, thereby forming a connected array of the sealing holders 38a–38e and hence an interconnected array of the filter cartridges 18a–18e (see FIGS. 2 and 5).

Next, the thrust plate 72 is positioned on the sealing holders 38a–38e, and the cover 14 is then applied to the housing 12 of the filter assembly 10 (see FIG. 4A). As the cover 14 is applied to the housing 12, the extension 16 of the cover 14 engages the thrust plate 72 and thereby forces same against the sealing holders 38a–38e (see FIG. 1). The thrust plate 72 engages the exposed portions 46 of the balls 44 of the sealing holders 38a–38e (i.e., the portions of the balls 44 extending above the rings 42) and, in turn, biases the sealing holders 38a–38e against the filter cartridges 18a–18e, respectively.

During the application of the thrust plate 72 to the sealing holders 38a–38e, the sealing caps 40 of the sealing holders 38a–38e are free to move longitudinally (i.e., vertically) relative to one another so as to automatically and properly position themselves with respect to their corresponding filter cartridges 18a–18e. Moreover, the balls 44 are compressed by the thrust plate 72 and thereby perform a spring-like function (i.e., the balls 44 urge their associated sealing caps 40 towards the filter cartridges 18a–18e and hence the filter cartridges 18a–18e towards the bottom plate 28). More particularly, each of the balls 44 is compressed to a degree in accordance with the length of its corresponding one of the filter cartridges 18a–18e (see FIG. 4B). In the foregoing manner, the sealing holders 38a–38e automatically adjust themselves to compensate for the differences in the length of the filter cartridges 18a–18e. This length compensating function of the sealing holders 38a–38e will be discussed in greater detail below with specific reference to FIGS. 4A and 4B.

Referring to FIGS. 4A and 4B, the filter cartridge 18c has a length which is greater than those of the filter cartridges 18b, 18d. Because of the movable tongue and groove connection between the sealing holder 38c and the sealing holders 38b, 38d, the sealing holder 38c is automatically positioned at an elevation slightly higher than those of the sealing holders 38b, 38d (see FIG. 4A). When the thrust plate 72 is applied to the sealing holders 38b–38d, the ball 44 of the sealing holder 38c is compressed to a degree greater than those to which the balls 44 of the sealing holders 38b, 38d are compressed, thereby compensating for the greater length of the filter cartridge 18c.

The sealing holders 38a–38e also perform a sealing function. That is, the sealing holders 38a–38e are adapted to seal the open top ends 22 of the filter cartridges 18a–18e, respectively. More particularly, as the thrust plate 72 forces the sealing holders 38a–38e against the filter cartridges 18a–18e, respectively, the sealing ridges 52 of the sealing holders 38a–38e engage the open top ends 22 of the filter cartridges 18a–18e, respectively, in a fluid-tight manner (see FIG. 4B). In this manner, fluid flow through the open top ends 22 is prevented during the filtering operation.

Figure 5:
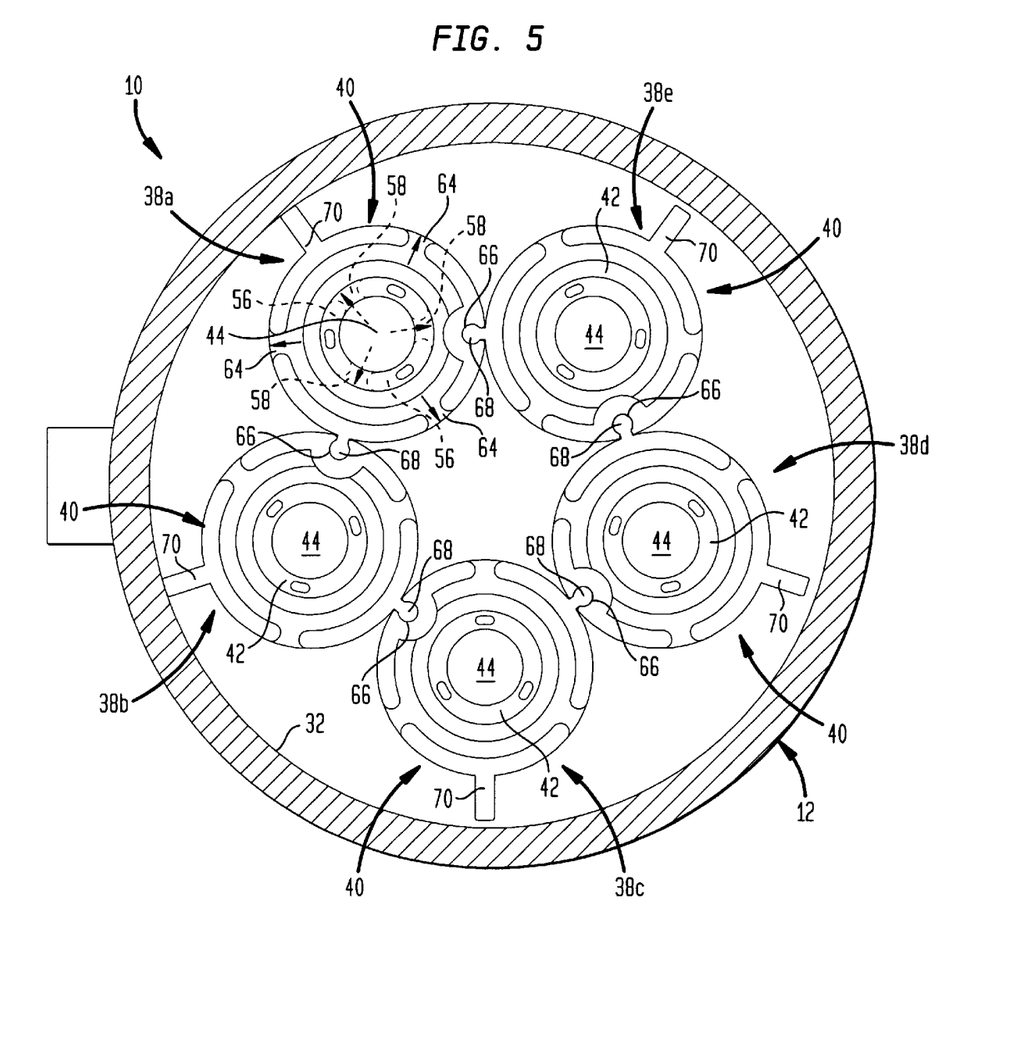
FIG. 5 is a top plan view of the sealing holders shown in FIG. 2.

The sealing holders 38a–38e further function to automatically and properly align (i.e., position) themselves and therefore the filter cartridges 18a–18e relative to the housing 12. More particularly, as described above, in mounting the sealing holders 38a–38e on the filter cartridges 18a–18e, respectively, the positioning ribs 50 of the sealing holders 38a–38e are inserted into the openings 26 of the filter cartridges 18a–18e, respectively. The positioning ribs 50 cooperate with the filter cartridges 18a–18e to automatically position same in proper alignment relative to the sealing holders 38a–38e (see FIG. 4A). In addition, the aligning ribs 70 of the sealing holders 38a–38e are adapted to come in contact with the inner wall 32 (i.e., the wall surrounding the filter cartridges 18a–18e) of the housing 12 so as to cooperate with same for properly positioning and aligning the connected array of the sealing holders 38a–38e and thus the filter cartridges 18a–18e in the housing 12. For instance, as shown in FIG. 5, the aligning ribs 70 of the sealing holders 38a, 38b engage the inner wall 32 of the housing 12 and thereby prevent the connected array of sealing holders 38a–38e and hence the interconnected array of the filter cartridges 18a–18e from moving out of proper alignment relative to the housing 12.

It should be appreciated that the present invention provides numerous advantages over the prior art discussed above. For instance, as described above, the sealing holders 38a–38e seal, hold (i.e., retain), align and interconnect the array of the filter cartridges 18a–18e. In addition, because the sealing holders 38a–38e are independent from the thrust plate 72 and the cover 14 (i.e., they are not secured or attached thereto), they are adapted to be independently mounted on their associated filter cartridges 18a–18e. In this manner, the filter cartridges 18a–18e need not be properly aligned relative to the thrust plate 72 and/or the cover 14 prior to the application of same to the housing 12, thereby facilitating the assembly of the filter assembly 10. Further, because the rings 42 are supported on the supporting ribs 56 and do not therefore obstruct the channels 58, fluid flowing onto the sealing holders 38a–38e is drained from same through the channels 58 and then through the channels 64 (as indicated by the arrows in solid and broken line representation in FIG. 5). As a result, fluid is prevented from collecting in the sealing holders 38a–38e. Moreover, because the positioning ribs 50 of the sealing holders 38a–38e are manually and selectably breakable (i.e., frangible) from the sealing caps 40, in the event that the diameter of the opening of an associated filter cartridge is small such that the positioning ribs of a sealing holder cannot be inserted into the filter cartridge's opening, one or more of the positioning ribs can be broken off from the sealing cap to accommodate such a filter cartridge.

It should be noted that the present invention can have many variations and modifications. For instance, as noted above, one or more of the sealing holders 38a–38e can have a size, shape and construction different from the other sealing holders depending upon specific use requirements. Similarly, a different number of sealing holders can be utilized depending upon the number of filter cartridges housed in a filter housing. Moreover, the sealing holders 38a–38e can be modified for use in connection with other geometrical arrays of filter cartridges (e.g., rectangular, linear and irregularly shaped arrays). In addition, one or more of the sealing holders 38a–38e can be adapted to be connected to more than two adjacent sealing holders. Further, the various components of the sealing holders 38a–38e can be eliminated or replaced by other mechanisms. For example, the balls 44 can be replaced with other compressible devices, such as cylindrically shaped resilient members or mechanical springs. In addition, the positioning ribs 50 can be replaced with other mechanisms, such as cylindrical extensions, permanently or removably mounted to the sealing caps 40 or they can be completely omitted. Further, the supporting ribs 56 and/or the pins 60 of the sealing holders 38a–38e can be eliminated. The retaining rings 42 of the sealing holders 38a–38e can be replaced with other mechanisms for retaining the resilient balls 44 in place or can be integrally formed with the sealing caps 40 with the balls 44 retained therein. The aligning ribs 70 can also be eliminated or replaced by other mechanisms. Moreover, each of the sealing holders 38a–38e can be provided with more than one aligning rib.

It should also be noted that the present invention can be used in connection with other types of filter cartridges and/or filter assemblies. For instance, the sealing holders 38a–38e can be used for mounting filter cartridges having upper ends closed by end caps inserted thereinto or formed integrally therewith. In such circumstances, the positioning ribs 70 of the sealing holders 38a–38e are broken off therefrom so as to allow the sealing holders 38a–38e to be positioned on the closed upper ends of the filter cartridges. In addition, the sealing holders 38a–38e can be used in connection with a filter assembly having a cover pivotally mounted or clamped to the housing. Further, the thrust plate 72 can be free to rotate during the application of the cover 14 to the housing 12. The thrust plate 72 can also be eliminated or integrally formed with the cover 14. The thrust plate 72 can also be replaced by a component of the cover 14 or other conventional mechanisms. In addition, the sealing holders 38a–38e of the present invention can be used in connection with a filter assembly having a plurality of arrays of filter cartridges, each array of filter cartridges being independently and separately housed in the filter unit's housing. In such circumstances, aligning ribs 70 of the sealing holders 38a–38e come in contact with surfaces of the housing, each of which encloses one of the arrays of filter cartridges, rather than the inner wall of the housing.

Figure 6:
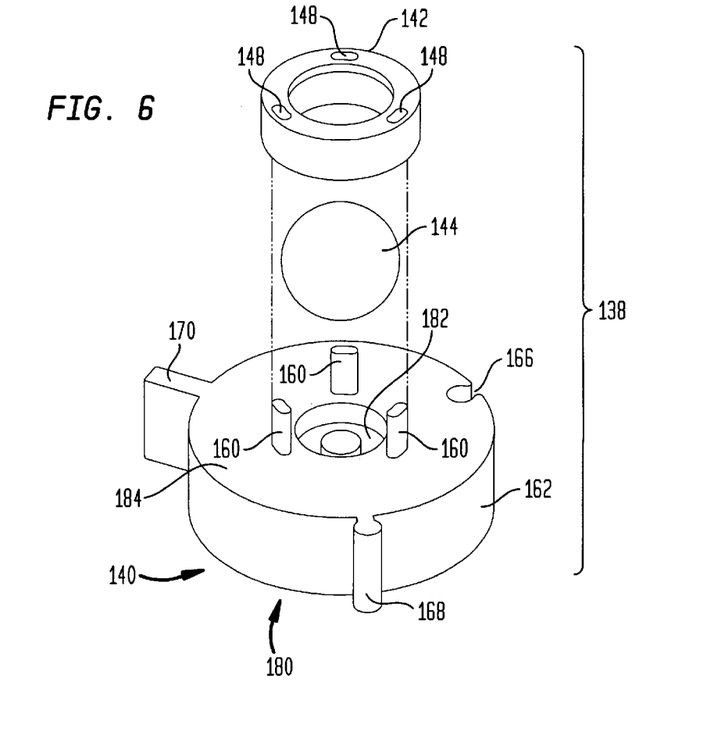
FIG. 6 is an exploded perspective view of a filter cartridge sealing holder constructed in accordance with a second embodiment of the present invention.

FIG. 6 depicts a second embodiment of the present invention. Elements illustrated in FIG. 6, which correspond, either identically or substantially, to the elements described above with respect to the embodiment of FIGS. 1–5 have been designated by corresponding reference numerals increased by one hundred. Unless otherwise stated, the embodiment of FIG. 6 is constructed, assembled and used in the same basic manner as the embodiment of FIGS. 1–5.

Referring to FIG. 6, a sealing holder 138 is constructed and used in the same basic manner as the sealing holders 38a–38e of the embodiment of FIGS. 1–5, except as follows. The sealing holder 138 includes a sealing cap 140 provided with a cylindrical unitary body 180. A groove 166, a tongue 168 and an aligning rib 170 are formed on an unitary sidewall 162 of the sealing cap 140. Moreover, a depression 182 is formed on an upper surface 184 of the sealing cap 140 for receiving a portion of a resilient ball 144 of the sealing holder 138. Pins 160 are also mounted on the upper surface 184 so as to be received in holes 148 of a retaining ring 142 and to thereby positively secure the retaining ring 142 on the sealing cap 140.

It will be understood that the embodiments described herein are merely exemplary and that a person skilled in the art may make many further variations and modifications without departing from the spirit and scope of the invention. All such variations and modifications are intended to be included within the scope of the invention as defined in the appended claims.

I claim:

1. A holding device for a filter element which has a longitudinal axis, said holding device comprising a body having a first surface and a second surface opposite said first surface, said first surface being sized and shaped so as to engage an end of an associated filter element; a compressible member positioned on said second surface of said body; and connecting means for directly and movably connecting said body to another body of at least one other identical holding device, said connecting means connecting said body to at least one other body in such a manner that said body is movable in an axial direction, which is substantially parallel to the longitudinal axis of the filter element, relative to any other body connected thereto by said connecting means, and said connecting means including a tongue extending in a lateral direction from said body and sized and shaped so as to be slidably received in a groove formed in a body of an identical holding device.

2. The holding device of claim 1, wherein said connecting means further includes a groove formed in said body and sized and shaped so as to slidably receive a tongue extending from a body of another identical holding device.

3. The holding device of claim 2, wherein said body includes a sidewall extending in an axial direction and having an outer peripheral surface, said tongue extending outwardly from said outer peripheral surface of said sidewall and said groove extending inwardly from said outer peripheral surface of said sidewall.

4. The holding device of claim 3, wherein said compressible member includes a resilient ball positioned on said second surface of said body.

5. The holding device of claim 4, further comprising retaining means for retaining said ball on said second surface of said body.

6. The holding device of claim 5, wherein said retaining means includes a ring positioned on said second surface of said body for capturing said ball between said ring and said second surface of said body.

7. The holding device of claim 6, wherein said ring has an aperture formed therein, said ring being sized and shaped so as to permit a portion of said ball to extend above said ring through said aperture.

8. The holding device of claim 7, wherein said ring includes a plurality of holes formed therein; and wherein said body further includes a plurality of pins, each of which projects axially from said second surface of said body and is sized and shaped so as to be inserted into a corresponding one of said holes of said ring.

9. The holding device of claim 8, further comprising aligning means for aligning said body in proper position relative to a housing of an associated filter assembly.

10. The holding device of claim 9, wherein said aligning means includes an aligning rib extending laterally outwardly from said outer peripheral surface of said sidewall and sized and shaped so as to engage a housing of an associated filter assembly.

11. The holding device of claim 10, further comprising positioning means for positioning an associated filter element in proper alignment relative to said body.

12. The holding device of claim 11, wherein said positioning means includes a plurality of positioning ribs depending from said first surface of said body and sized and shaped so as to be inserted into an opening formed in an end of an associated filter element.

13. The holding device of claim 12, wherein each of said positioning ribs is frangible, whereby said positioning ribs may be selectively removed from said body to accommodate filter elements having different size openings.

14. The holding device of claim 13, wherein said first surface includes sealing means for sealing an opening formed in an end of an associated filter element.

15. The holding device of claim 14, wherein said sealing means includes an annular sealing projection extending from said first surface.

16. The holding device of claim 15, wherein said sidewall includes three sidewall sections which project axially from said second surface of said body and which are spaced apart from each other so as to form a corresponding number of first channels therebetween, each of said sidewall sections including an outer peripheral surface, said tongue extending outwardly from said outer peripheral surface of one of said sidewall sections, said groove extending inwardly from said outer peripheral surface of another of said sidewall sections, and said aligning rib extending outwardly from said outer peripheral surface of the other of said sidewall sections.

17. The holding device of claim 16, wherein said body further includes a plurality of supporting ribs arranged on said second surface of said body for supporting said ring thereon and spaced apart from each other so as to form a corresponding number of second channels therebetween, said first channels and said second channels being sized and shaped so as to permit liquid flowing onto said second surface of said body to drain therefrom.

18. The holding device of claim 15, wherein said sidewall includes an unitary sidewall extending between said first surface to said second surface.

19. The holding device of claim 18, wherein said second surface includes a depression formed therein for receiving another portion of said ball.

20. The holding device of claim 1, wherein said compressible member includes a resilient ball positioned on said second surface of said body.

21. The holding device of claim 20, further comprising retaining means for retaining said ball on said second surface of said body.

22. The holding device of claim 21, wherein said retaining means includes a ring positioned on said second surface of said body for capturing said ball between said ring and said second surface of said body.

23. The holding device of claim 1, further comprising positioning means for positioning an associated filter element in proper alignment relative to said body.

24. The holding device of claim 23, wherein said positioning means includes a plurality of positioning ribs depending from said first surface of said body and sized and shaped so as to be inserted into an opening formed in an end of an associated filter element.

25. The holding device of claim 24, wherein each of said positioning ribs is frangible, whereby said positioning ribs may be selectively removed from said body to accommodate filter elements having different size openings.

26. The holding device of claim 1, further comprising aligning means for aligning said body in proper position relative to a housing of an associated filter assembly.

27. The holding device of claim 26, wherein said aligning means includes an aligning rib extending in said lateral direction from said body and sized and shaped so as to engage a housing of an associated filter assembly.

28. The holding device of claim 1, further comprising draining means for draining liquid flowing onto said second surface of said body therefrom.

29. The holding device of claim 28, wherein said draining means includes a plurality of channels formed in said body.

30. Filtering apparatus comprising a plurality of filter elements, each of which has a first end and a second end opposite said first end; housing means for housing said filter elements therein; supporting means for supporting said first ends of said filter elements therefrom in said housing means; biasing means for biasing said filter elements towards said supporting means; and a plurality of holding members, each of said holding members including a body, which has a first surface sized and shaped so as to engage said second end of a corresponding one of said filter elements and a second surface opposite said first surface, urging means located on said second surface of said body so as to be engageable by said biasing means for urging said body towards a corresponding one of said filter elements in response to the engagement of said urging means by said biasing means, and connecting means for directly and movably connecting one of said bodies of said holding members to at least another one of said bodies, each of said bodies being directly and movably connected to a pair of adjacent bodies such that said bodies form a connected array and hence interconnect said filter elements to one another in a similar array, each of said bodies being movable relative to all of the other of said bodies in an axial direction which is substantially parallel to a longitudinal axis of a corresponding one of said filter elements, said connecting means including a tongue, which extends laterally from a corresponding one of said bodies, and a groove, which is formed in a corresponding one of said bodies, said tongue being sized and shaped so as to be slidably received in said groove of one of said pair of adjacent bodies, and said groove being sized and shaped so as to slidably receive said tongue of another one of said pair of adjacent bodies.

31. The filtering apparatus of claim 30, wherein each of said holding members includes aligning means for aligning said bodies and hence said filter elements in proper position relative to said housing means.

32. The filtering apparatus of claim 31, wherein said aligning means includes an aligning rib extending laterally from a corresponding one of said bodies.

33. The filtering apparatus of claim 32, wherein said housing means includes a wall, each of said aligning ribs being sized and shaped so as to engage said wall of said housing means during the engagement of said urging means by said biasing means and to thereby cooperate with the other of said aligning ribs so as to properly align said bodies and hence said filter elements relative to said housing means.

34. The filtering apparatus of claim 33, wherein each of said urging means is compressible in response to the engagement of said urging means by said biasing means so as to compensate for any differences in the lengths of said filter elements.

35. The filtering apparatus of claim 34, wherein each of said urging means includes a resilient ball positioned on said second surface of a corresponding one of said bodies; and wherein each of said holding members includes retaining means for retaining a corresponding one of said balls on said second surface of said corresponding one of said bodies.

36. The filtering apparatus of claim 35, wherein each of said holding members includes positioning means for positioning a corresponding one of said filter elements in proper alignment relative to a corresponding one of said bodies.

37. The filtering apparatus of claim 36, wherein said positioning means includes a plurality of positioning ribs depending from said second surface of a corresponding one of said bodies, said positioning ribs being sized, shaped and oriented so as to be insertable into an opening formed in said first end of a corresponding one of said filter elements.

38. The filtering apparatus of claim 37, wherein each of said bodies includes an annular sealing projection extending from said first surface of a corresponding one of said bodies.

39. The filtering apparatus of claim 30, wherein each of said holding members includes aligning means for aligning said bodies and hence said filter elements in proper position relative to said housing means.

40. The filtering apparatus of claim 39, wherein each of said aligning means includes an aligning rib extending laterally from a corresponding one of said bodies.

41. The filtering apparatus of claim 40, wherein said housing means includes a wall, each of said aligning ribs being sized and shaped so as to engage said wall of said housing means during the engagement of said urging means by said biasing means and to thereby cooperate with the other of said aligning ribs so as to properly align said bodies and hence said filter elements relative to said housing means.

42. Apparatus for holding an array of filter elements, each of which has a longitudinal axis, said apparatus comprising at least a pair of holding members, one of said holding members including a first body, which has a first surface sized and shaped so as to engage an end of an associated filter element and a second surface opposite said first surface, and a first compressible member positioned on said second surface of said first body, another of said holding members including a second body, which has a third surface sized and shaped so as to engage an end of an associated filter element and a fourth surface opposite said third surface, and a second compressible member positioned on said fourth surface, said first body having a first connecting member conjointly movable with said first body, said second body having a second connecting member conjointly movable with said second body, said first connecting member engaging said second connecting member such that said first connecting member is movable relative to said second connecting member in an axial direction substantially parallel to the longitudinal axes of the filter elements, whereby said first and second bodies are movable relative to each other in said axial direction.

43. The apparatus of claim 42, wherein said first and second connecting members are sized and shaped in such a manner that said first and second bodies are inhibited from moving in a lateral direction relative to one another.

44. The apparatus of claim 43, wherein said first connecting member includes a tongue extending from said first body in said lateral direction; and wherein said second connecting member includes a groove formed in said second body and slidably receiving said tongue.

45. The apparatus of claim 44, wherein each of said first and second bodies includes a sidewall extending in said axial direction and having an outer peripheral surface; wherein said tongue extends outwardly from said outer peripheral surface of said sidewall of said first body; and wherein said groove extends inwardly from said outer peripheral surface of said sidewall of said second body.

46. The apparatus of claim 42, wherein said first compressible member includes a first resilient ball positioned on said second surface of said first body; and wherein said second compressible member includes a second resilient ball positioned on said fourth surface of said second body.

47. The apparatus of claim 46, wherein said one of said holding members includes first retaining means for retaining said first ball on said second surface of said first body; and wherein said another of said holding members includes second retaining means for retaining said second ball on said fourth surface of said second body.

48. The apparatus of claim 47, wherein said first retaining means includes a first ring positioned on said second surface of said first body for capturing said first ball between said first ring and said second surface of said first body; and wherein said second retaining means includes a second ring positioned on said fourth surface of said second body for capturing said second ball between said second ring and said fourth surface of said second body.

49. The apparatus of claim 42, wherein said one of said holding members includes first positioning means for positioning a corresponding one of the filter elements in proper alignment relative to said first body; and wherein said another of said holding members includes second positioning means for positioning a corresponding one of the filter elements in proper alignment relative to said second body.

50. The apparatus of claim 49, wherein said first positioning means includes a plurality of first positioning ribs depending from said first surface of said first body and sized and shaped so as to be inserted into an opening formed in an end of a corresponding one of the filter elements; and wherein said second positioning means includes a plurality of second positioning ribs depending from said third surface of said second body and sized and shaped so as to be inserted into an opening formed in an end of a corresponding one of the filter elements.

51. The apparatus of claim 50, wherein each of said first positioning ribs and said second position ribs is frangible, whereby said first positioning ribs and said second positioning ribs are selectively removable from said first body and said second body, respectively, to accommodate filter elements having different size openings.

52. The apparatus of claim 42, further comprising aligning means for aligning said first and second bodies in proper position relative to a housing of an associated filter assembly.

53. The apparatus of claim 52, wherein said aligning means includes an aligning rib extending in a lateral direction from each of said first and second bodies and sized and shaped so as to engage a housing of an associated filter assembly.

54. The apparatus of claim 42, wherein said one of said holding members includes first draining means for draining liquid therefrom; and wherein said another of said holding members includes second draining means for draining liquid therefrom.

55. The apparatus of claim 54, wherein each of said first and second draining means includes a plurality of channels formed in a corresponding one of said first and second bodies.

56. A holding device for a filter element, comprising a body having a first surface and a second surface opposite said first surface, said first surface being sized and shaped so as to engage an end of an associated filter element; a compressible member positioned on said second surface of said body; connecting means for directly and movably connecting said body to another body of at least one other identical holding device; and draining means for draining liquid flowing onto said second surface of said body therefrom, said draining means including a plurality of channels formed in said body.

57. Filtering apparatus comprising a plurality of filter elements, each of which has a first end and a second end opposite said first end; housing means, including a wall, for housing said filter elements therein; supporting means for supporting said first ends of said filter elements therefrom in said housing means; biasing means for biasing said filter elements towards said supporting means; and a plurality of holding members, each of said holding members including a body, which has a first surface sized and shaped so as to engage said second end of a corresponding one of said filter elements and a second surface opposite said first surface, urging means located on said second surface of said body so as to be engageable by said biasing means for urging said body towards a corresponding one of said filter elements in response to the engagement of said urging means by said biasing means, connecting means for directly and movably connecting said body to at least another one of said bodies, and aligning means for aligning said bodies and hence said filter elements in proper position relative to said housing means, each of said aligning means including an aligning rib extending laterally from a corresponding one of said bodies, and each of said aligning ribs being sized and shaped so as to engage said wall of said housing means during the engagement of said urging means by said biasing means, thereby cooperating with the other of said aligning ribs to properly align said bodies and hence said filter elements relative to said housing means.

* * * * *